United States Patent [19]

Orrison

[11] 4,038,972

[45] Aug. 2, 1977

[54] SOLAR ENERGY COLLECTOR APPARATUS

[76] Inventor: William W. Orrison, 100 Aylesbury Hill, San Antonio, Tex. 78209

[21] Appl. No.: 671,340

[22] Filed: Mar. 29, 1976

[51] Int. Cl.² .............................................. F24J 3/02
[52] U.S. Cl. .................................. 126/271; 126/270; 237/1 A
[58] Field of Search ............... 126/270, 271; 237/1 A; 350/294, 293, 296, 297, 303, 304, 285

[56] References Cited

U.S. PATENT DOCUMENTS

| 2,712,772 | 7/1955 | Trombe | 126/270 X |
| 2,803,591 | 8/1957 | Coanda et al. | 126/270 X |
| 3,171,403 | 3/1965 | Drescher | 126/270 |
| 3,200,820 | 8/1965 | Garrett | 126/271 |
| 3,466,119 | 9/1969 | Francia | 126/270 X |
| 3,887,263 | 6/1975 | Thompson | 350/294 X |
| 3,915,147 | 10/1975 | Rineer | 126/271 |
| 3,964,464 | 6/1976 | Hockman | 126/271 |

FOREIGN PATENT DOCUMENTS

| 394,232 | 1924 | Germany | 126/271 |
| 370,365 | 1939 | Italy | 126/270 |
| 772,765 | 1957 | United Kingdom | 237/1 SL |

Primary Examiner—William F. O'Dea
Assistant Examiner—Larry Jones
Attorney, Agent, or Firm—Gunn & Lee

[57] ABSTRACT

The present invention includes a solar energy collector for concentrating the sun's rays on a conduit having a fluid flowing therethrough. A primary reflector is oriented in a north-south direction. The sun's rays are reflected from the primary reflector to a smaller secondary reflector located thereabove, which further reflects the sun's rays onto a conduit recessed below the primary reflector. The concentrated sun's rays on the conduit heats the conduit. The heated conduit further heats a fluid flowing through the conduit. The heated fluid is used to generate energy, directly or indirectly. An automatic control device, including a light sensor, continually adjusts the primary and secondary reflectors to insure that the sun's rays are striking the primary reflector at the proper angle. Adjustments of the primary and secondary reflectors are made by pivotal movement about the conduit which does not move.

14 Claims, 5 Drawing Figures

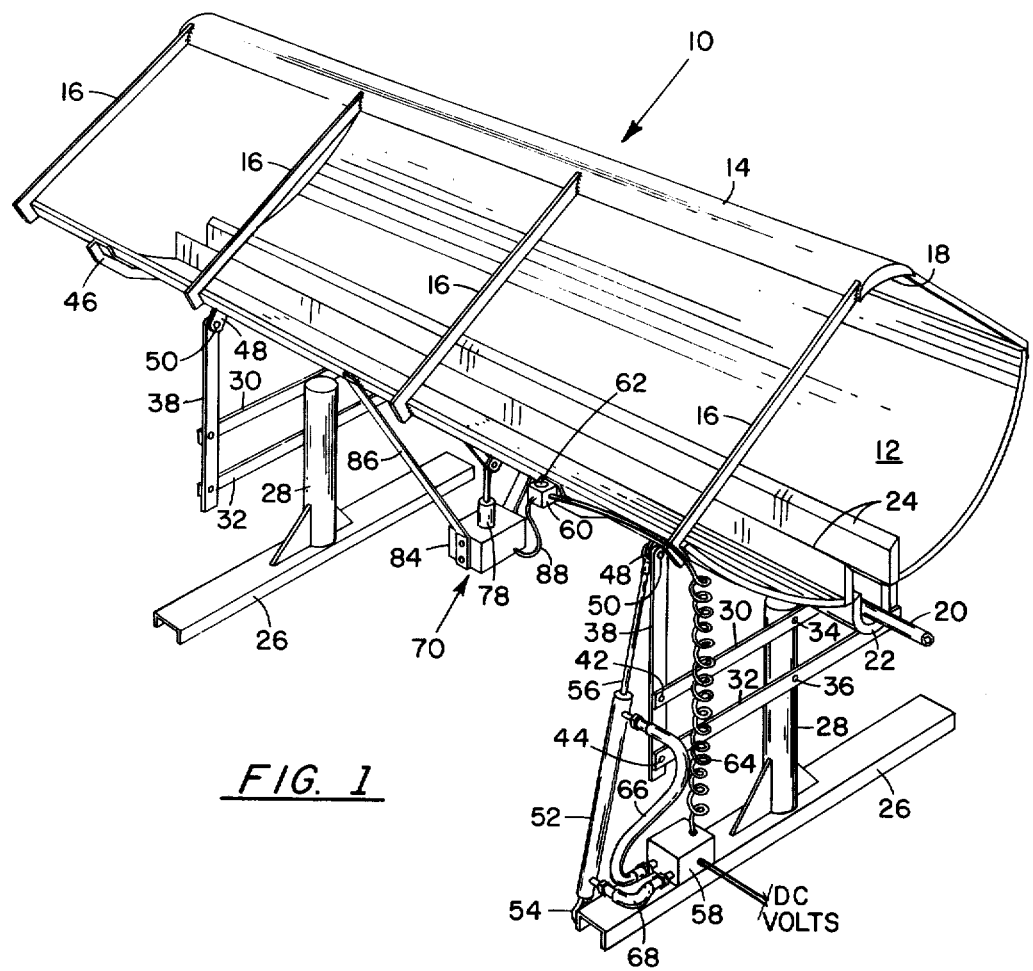

SOLAR ENERGY COLLECTOR APPARATUS

BACKGROUND OF THE INVENTION

The present invention relates to a solar energy collection system and, more particularly, to the solar energy collector. The solar energy collector has a trough-like primary reflector that reflects the sun's rays to a secondary reflector located thereabove. The secondary reflector in turn reflects the sun's rays onto a conduit thereby heating the conduit and a fluid flowing thererthrough. An automatic control mechanism continually adjusts the primary and secondary reflectors to insure the sun's rays are striking the primary reflector at the proper angle.

BRIEF DESCRIPTION OF THE PRIOR ART

Man has tried to harness the sun's energy for many years. Even at the beginning of the present century, many different types of devices to harness solar energy were being proposed. Some of these devices even included trough-shaped reflector surfaces that would reflect the sun's rays onto a conduit having a fluid flowing therethrough. The fluid would be heated and then utilized as a source of energy. However, the trough-shaped reflector devices has numerous problems, including inability to concentrate a large amount of the sun's rays on a single conduit thereby increasing the termperature of the fluid flowing therethrough to the utmost.

Many of these early solar energy collection systems even had manual controls for adjustment of the reflectors thereby insuring that the sun was continually striking the reflector at the proper angle. However, these hand operated control mechanisms were crude and had to be continually adjusted as the sun's rays would strike the reflector at a different angle.

One of the primary problems with prior solar energy collection systems was that attempts to concentrate the sun's rays form a single reflector were inadequate to give sufficient heat. By using a single reflection of the sun's rays, it was difficult to keep the reflector in proper alignment with respect to the sun. Furthermore, a conduit through which a fluid was flowing and being heated by the sun's rays was exposed to the atmosphere thereby causing the conduit and the fluid to be cooled.

SUMMARY OF THE INVENTION

It is an object of the invention to provide a solar energy collection apparatus.

It is another object of the present invention to provide a trough-shaped primary reflector for receiving the sun's rays, and reflecting the sun's rays to a secondary reflector. The secondary reflector in turn reflects the sun's rays onto a conduit having a fluid flowing therethrough.

It is yet another object of the present invention to provide duel reflectors mounted together wherein the primary reflector concentrates the sun's rays onto a reflecting surface of a secondary reflector. The secondary reflector further concentrates and reflects the sun's rays onto a conduit located in an insulated structure below the primary reflector.

It is still another object of the present invention to provide a mechanism for automatically positioning a primary and a secondary reflector to receive the sun's rays at the proper angle for reflection onto a conduit having a fluid flowing therethrough.

The present invention includes a trough-shaped primary reflector normally located in a north-south direction. Positioned above the primary reflector is a secondary reflector. The sun's rays first strike the primary reflector and are reflected and concentrated on a much smaller secondary reflector. The secondary reflector in turn further relfects and concentrates the sun's rays onto a conduit located below the primary reflector. The primary reflector is supported by a mechanism having a light sensing device and appropriate controls connected thereto. The position of the primary reflector may be changed from an eastwardly to a westwardly direction as the sun moves overhead as determined by the light sensing device. An opening in which the conduit is located is closed at nights for insulation purposes. The fluid which flows through, and is heated by, the conduit also flows through a heat sink. The heat sink may heat a secondary fluid, such as water, thereby causing steam. The steam is used for the generation of power by any convenient means, such as a steam turbine. The preferred fluid flowing through conduit and heated by the sun's rays should have a high vaporization temperature and a low freezing point. Such a liquid may be sodium. It is possible for the fluid heated in the conduit to perform work directly without a further conversion to generated steam.

BRIEF DESCRIPTION OF THE DRAWINGS

FIG. 1 is a perspective view of the solar energy collector.

FIG. 2 is an end view of FIG. 1 illustrating the mounting structure and the reflection of the sun's rays.

DESCRIPTION OF THE PREFERRED EMBODIMENT

Figure 3:
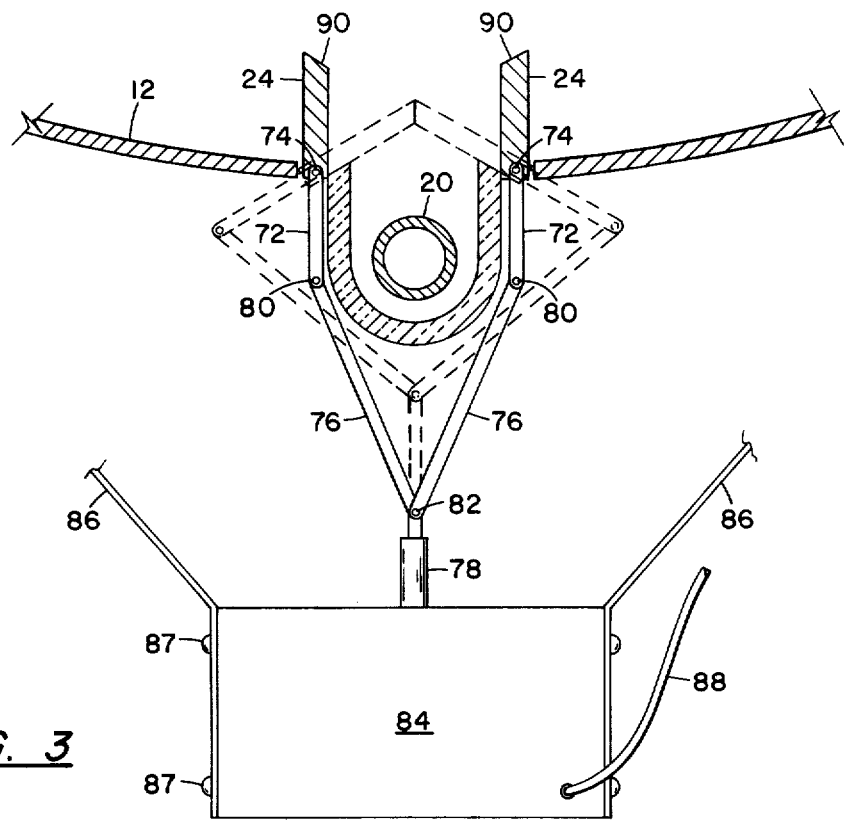
FIG. 3 is an enlarged partial sectional view of the door closure mechanism shown in FIG. 1.

Referring now to FIG. 1, there is shown a solar energy collector represented generally by the reference numeral 10. The solar energy collector 10 includes a primary reflector 12 and a secondary reflector 14. The primary reflector 12 is a large trough-shaped surface that will receive a large amount of the sun's rays. The secondary reflector 14, which is mounted above the primary reflector 12 by means of struts 16, will receive the concentrated sun's rays reflected from the primary reflector 12 onto the concave lower surface 18 of the secondary reflector 14. The concave lower surface 18 of the secondary reflector 14 will further concentrate and reflect the sun's rays onto the conduit 20, as will be subsequently described in more detail.

The conduit 20 is stationarily mounted and located inside of a U-shaped insulator 22. The U-shaped insulator 22 has doors 24 located at the top thereof. The doors 24 are pivotally connected to the lower center portion of the primary reflector 12, as can be seen in FIG. 3. The U-shaped insulator 22 and the conduit 20 contained therein are located below the primary reflector 12, immediately beneath the doors 24.

The primary reflector 12 is mounted on stands 26, which have supporting posts 28 connected thereto.

Near the top of posts 28, a pair of cross supports 30 and 32 are pivotally connected. The upper cross support 30 is held to posts 28 by means of pin 34. The lower cross support 32 is held to posts 28 by means of pin 36. Both of the cross supports 30 and 32 are free to pivot on pins 34 and 36, respectively. Attached to each end of the cross supports 32 are vertical supports 38 and 40. The cross supports 30 are also connected to the vertical supports 38 and 40 by means of pins 42. Likewise, cross supports 32 are connected to vertical supports 40 by means of pins 44. The cross supports 30 and 32, and the vertical supports 38 and 40, form a parallelogram. The cross supports 30 and 32, and the vertical supports 38 and 40, are free to pivot on pins 34, 36, 42 and 44 to change the shape of the parallelogram, but not the dimensions. The vertical supports 38 and 40 always remain perpendicular with respect to the stands 26, and parallel to posts 28.

The uppermost portion of the vertical supports 38 and 40 are pivotally connected to angle braces 46, which support the primary refelctor 12. The connection between the angle brace 46 and the vertical supports 38 and 40 is through tabs 48 that form a part of the angle braces. A pin 50 extends through the tabs 48 and the uppermost portion of the vertical supports 38 and 40 to allow the pivotal movement between tabs 48 and vertical supports 38 and 40.

The angle at which the sun's rays are received by the primary reflector 12 is controlled by hydraulic cylinder 52. Base 54 of the cylinder 52 is pivotally connected to stand 26. The shaft 56, which extends from the top of the hydraulic cylinder 52, is pivotally connected to one of the tabs 48 by means of pin 50. Operation of the hydraulic cylinder 52 will cause the primary reflector 12 to tilt with respect to the stand 26. The secondary reflector 14 is carried by the primary reflector 12.

Controls of the hydraulic cylinder 52 are contained in control box 58. The controls used in control box 58 are within the state of the art with may different types of control systems being possible. All that is necessary is that the control box 58 receive a given source of power, such as a DC voltage. Another input for the control box 58 (which could be considered as part of the control box 58) is from a light sensing device 60 mounted on the side of the primary reflector 12. The light sensing device 60 has a lens 62 in the top thereof so that light may be received in the light sensing device. If the sun's rays are not being received from directly overhead, as determined by the light sensing device 60 which receives the rays through the lens 62, a control signal will be sent through cable 64 to control box 58. Control box 58 will in turn cause fluid to flow through hoses 66 and/or 68 to the hydraulic cylinder 52 thereby tilting the primary reflector 12 until the sun's rays strike the primary reflector 12 at the proper angle.

FIG. 2 shows a right-hand end view of FIG. 1 without showing the door opening mechanism as will be subsequently described. All of the sun's rays will be essentially parallel because of the distance of the sun from the earth's surface. For the purposes of describing the reflection of the sun's rays by the primary reflector 12 and the secondary reflector 14, two sample rays represented by dotted lines A and B are shown. Assuming that the sun's ray A strikes the primary reflector 12 at an angle 60', the reflector angle of the sun's ray A' would also be at the same angle 60'. The sun's ray A' will then strike the concave lower surface 18 of the secondary reflector 14 and be reflected along line A".

The reflected ray A" will then stike conduit 20 through which a fluid is flowing. The sun's ray B strikes the primary reflector 12 at an angle $\alpha$, and is reflected along line B' at the same angle $\alpha$ with respect to the primary reflector. The rays B' is then reflected from the concave lower surface 18 of the secondary reflector 14 along line B", until it also strikes the conduit 20. All of the sun's rays, as reflected by the primary reflector 12, travel through focal point $f$ in front of the secondary reflector 14. From the secondary reflector 14, the focal point of the reflected rays is focal point $f'$, which is past the conduit 20. The reflecting surface of the primary reflector 12 is approximately 10 times larger than the reflecting surface lower concave surface 18 of secondary reflector 14. This allows the sun's rays to be concentrated by a factor of 10. From the secondary reflector 14 to the conduit 20, the surface area receiving the sun's rays has been further decreased by another factor of three. This allows an approximate concentration of the sun's rays on the conduit 20 by a factor of 30 over what may be received directly from the sun.

Figure 5:
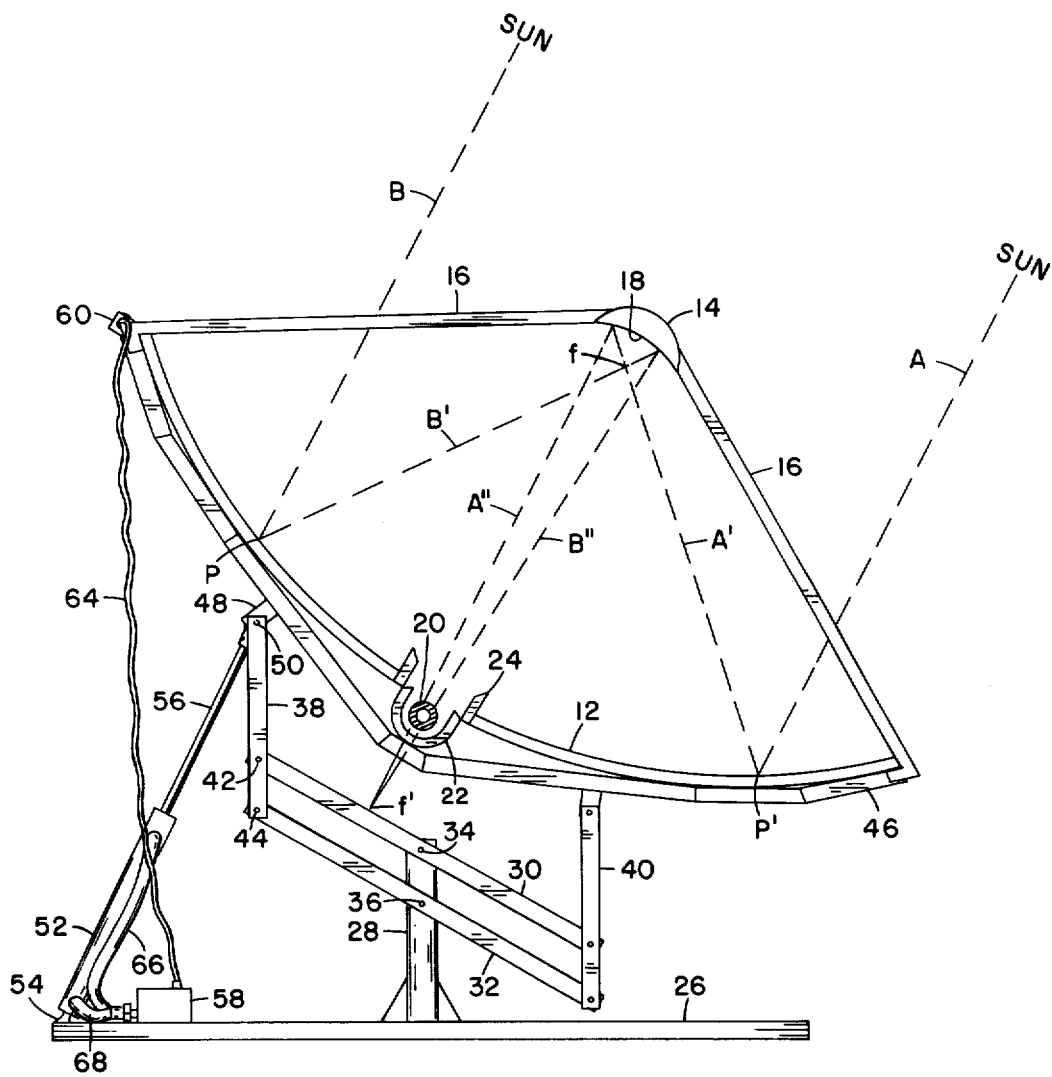
FIG. 5 is similar to FIG. 2 further illustrating the mounting structure and control mechanism for the positioning of the primary and secondary reflectors as the sun's rays are received from a different angle.

The sun's rays are being received by the light sensing device 60, which in turn sends cntrol signals to control box 58. The control box 58 adjusts the hydraulic cylinder 52 to tilt the primary reflector 12 either to the right or left. Assuming that the sun is in its normal mid-afternoon position, FIG. 5 shows a typical position of the primary reflector 12. The light sensing device 60 continually sends a control signal to the control box 58, which adjusts the hydraulic cylinder 52 to extend or contract the shaft 56. Extension of the shaft 56 causes the parallelogram formed by cross supports 30 and 32, and vertical supports 38 and 40 to pivot, thereby tilting the primary reflector so that the sun's rays continually strike the primary reflector at the proper angle. The focal point $f$ in front of the concave lower surface 18 of the secondary reflector 14 is maintained, as well as the focal point $f'$ below the conduit 20. The angle at which the sun's rays strike a particular point on the primary reflector 12 remains the same as can be seen by $\alpha$ and $\alpha'$, which strikes points P and P' on the primary reflector 12. Tilting of the primary reflector 12 and secondary reflector 14 is about the conduit 20, which is stationary.

Referring back to FIG. 1, there is shown a door closure apparatus represented generally by the reference numeral 70. By referring to FIG. 1 in combination with FIG. 3, which is a partial sectional view along the longitudinal axis of the primary reflector 12 immediately adjacent to door closure apparatus 70, a better understanding of the door closure apparatus 70 can be obtained. The doors 24 have extensions 72 formed integral therewith. Both of the doors 24 and the extensions 72 are pivotally connected to the primary reflector 12 by means of pins 74. The lowermost portion of each of extensions 72 are in turn pivotally connected by pins 80 to connecting rods 76. The connecting rods 76 are connected on the lower end thereof, by means of pin 82 to shaft 78. The shaft 78 extends into door control box 84. The door control box 84 is securely held into position on the primary reflector 12 by means of bracket 86. Bracket 86 is held to door control box 84 by means of rivets 87. The bracket 86 is connected to the primary reflector 12 by any suitable means, such as welding.

While the door control box 84 may be of any particular construction well-known in the art, this preferred embodiment uses a solenoid device therein for the movement of shaft 78. Energization for the solenoid (not shown) contained within the door control box 84 is provided by light sensing device 60. If the light being received by the light sensing device 60 drops below a predetermined point, a control signal will be sent to door control box 84 by cable 88. Normally, the signal sent by light sensing device 60 will close the doors 24 via door control box 84 during twilight and nighttime hours, and open the doors 24 during daylight hours.

It should be realized that the door closure box 84 may be of many types of construction, such as a hydraulic cylinder. Also, the doors 24 may be manually opened and closed by an individual at the beginning or end of a day. It is also possible that the control signal could simply be from a manually operated switch contained at a convenient location. The reason for the doors 24 is to prevent heat loss from the conduit 20 during darkness. Notice that the doors 24 have a beveled edge 90 to insure a tight closure. The dotted line shown in FIG. 3 shows the doors 24 in the closed position.

Figure 4:
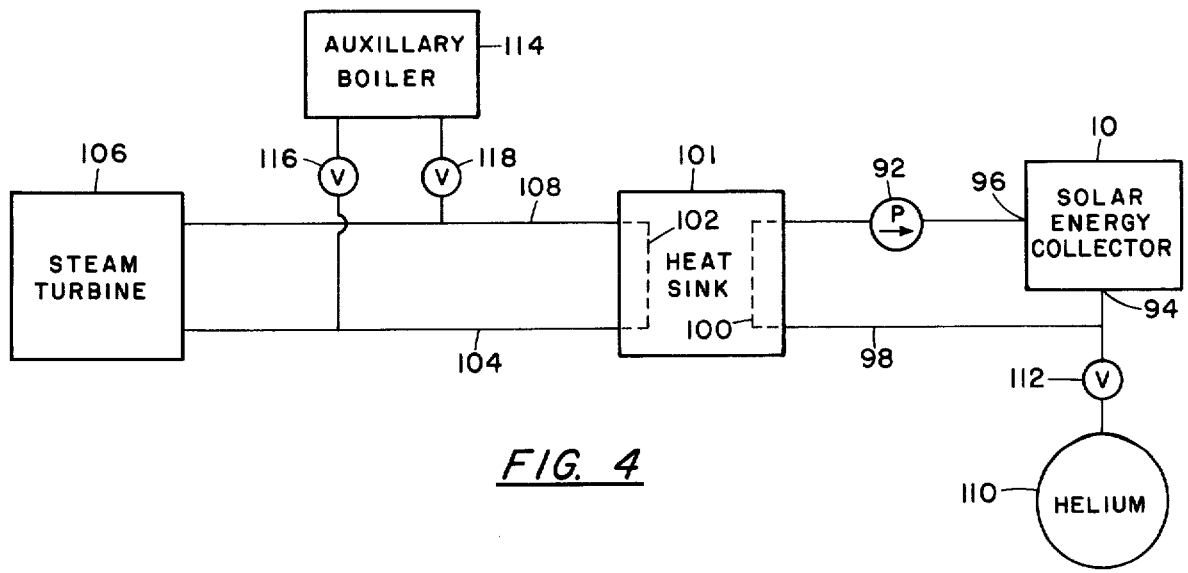
FIG. 4 is an illustrative block diagram of an energy system utilizing the solar system collector shown in FIG. 1.

Referring now to FIG. 4 of the drawings, there is shown a schematic representation of how the solar energy collector 10 may be used in a system. Since water has a boiling point of 100° C at seal level, it would be unsuitable for use in the solar heat collector. Applicant proposes to use a liquid that has a high vaporization point, such as liquid sodium, in the solar energy collector 10. While it is understood that the solar energy collector is normally oriented in a north-south direction, it should also be oriented on a slight incline so that the liquid sodium must be pumped through conduit 20, thereby insuring the rate of flow through the conduit 20. Referring to FIG. 4, the pump 92 would cause the sodium to flow through conduit 20 of solar energy collector 10. The outlet 94 should be slightly higher than the inlet 96. From outlet 94, the sodium heated by the sun's rays, while in conduit 20, flows through conduit 98 into heat sink 101. Inside of heat sink 101, the heat from the liquid sodium is transferred to another medium, such as water, for the performance of work. Coils 100, through which the heated sodium will flow, will be intertwined with coils 102 through which a medium, such as water, will be flowing. This will cause the heat to transfer from the heated sodium to the water thereby causing steam. Steam will flow from the coils 102 and heat sink 101 via conduit 104 to a steam turbine facility 106. From the steam turbine facility 106, liquid water will be returned to coils 102 of heat sink 101 via conduit 108.

Because liquid sodium is contained in the solar energy collector 10, it is imperative that oxygen not come in contact with surfaces over which the liquid sodium would flow. Therefore, a collapsible tank 110 is connected to the outlet 94 of the solar energy collector 10 by valve 112. A helium gas is collapsible tank 110 will fill any space not filled by the liquid sodium. This is important upon draining the liquid sodium from the solar energy collector 10. Also, an auxiliary boiler 114 is connected to conduits 104 and 108 by normally closed valves 116 and 118, respectively. It may be necessary to use the auxiliary boiler 114 upon starting the steam turbine 106 at the beginning of the day. The auxiliary boiler 114 would simply provide steam for the turbine when the energy received from the solar energy collector 10 is insufficient to drive the steam turbine 106.

It should be realized that the heat received by the liquid sodium from the solar energy collector 10 may be used directly for the performance of energy, without going through the energy conversion as described in conjunction with FIG. 4. The converting of the heat received from the solar energy collector to change water to steam is only one of many means of utilizing the energy being received from the sun's rays.

It should also be realized that the sun's rays could be further concentrated by varying the sizes of the primary reflector 12 and secondary reflector 14, as well as conduit 20. Also, additional concentration of the sun's rays may be possible by further reflection of the sun's rays from additional reflectors not shown and described in conjunction with the present invention.

I claim:

1. A solar energy system for collecting the sun's rays, said system comprising:
   an elongated primary reflector with an upper concave reflective surface and an elongated secondary reflector with a lower concave reflective surface, said elongated primary reflector reflecting and concentrating said sun's rays on said elongated secondary reflector attached to and carried above said primary reflector, said secondary reflector being smaller than and parallel to said primary reflector;
   stationary conduit means located below and parallel to an opening in a bottom of said primary reflector, said conduit means receiving said sun's rays further reflected and concentrated by said secondary reflector;
   means for pivotally adjusting said primary and secondary reflectors about said stationary conduit means for continually concentrating said sun's rays thereon;
   means for pumping a fluid through said conduit means to heat said fluid by said sun's rays, said conduit means being at an incline;
   means for converting heat from said fluid to usable energy.

2. The solar energy system, as given in claim 1, wherein said liquid is sodium.

3. The solar energy system, as given in claim 2, where a source of inert gas is connected to said conduit means to allow for loss of said sodium.

4. The solar energy system, as given in claim 1, wherein said means for converting includes a heat sink for converting water to steam to drive a steam powered energy generating device.

5. The solar energy system, as given in claim 1, wherein said pivotally adjusting means includes:
   light sensing means for generating a control signal;
   adjustable device pivotally connected between said primary reflector and a stationary base;
   parallelogram structure being pivotally together, said parallelogram structure being also pivotally connected between said stationary base and said primary reflector;
   said control signal operating said adjustable device to pivot said primary and secondary reflectors via said pivotal parallelograms structure to receive said sun's rays at a proper angle.

6. The solar energy system, as given in claim 5, comprising:
   an elongated opening along a bottom of said primary reflector, said conduit means being located below said elongated opening;
   insulation means extending below said opening and around said conduit means;
   door means connected to said primary reflector for closing said opening upon loss of said sun's rays thereby maintaining heat in said conduit means and fluid contained therein.

7. A solar energy collector apparatus for concentrating rays from the sun to heat a fluid flowing therethrough, said apparatus comprising:
- a primary reflector having an elongated concave upper reflective surface for receiving rays from the sun;
- a secondary reflector having an elongated concave lower reflective surface for receiving rays from the sun reflected from said upper reflective surface of said primary reflector, said reflected rays being concentrated on said lower reflective surface of said secondary reflector, said lower reflective surface having a substantially reduced reflective area from said upper reflective surface of said primary reflector;
- means for mounting said secondary reflector above said primary reflector with elongated axis of both reflector surfaces being parallel;
- conduit means stationarily mounted parallel to the elongated axis of said primary reflector, said conduit means receiving the sun's rays further concentrated and reflected by said lower reflective surface of said secondary reflector;
- means for pivoting said primary reflector and said secondary reflector about said conduit means;
- control means for sensing the rays of the sun and adjusting said pivoting means accordingly for the sun's rays to be reflected onto said conduit means as the sun's rays change direction.

8. The solar energy collector apparatus, as given in claim 7, wherein said pivoting means includes structure means pivotally attached to said primary reflector, said structure means also bieng pivotally connected to a base support, extendable control device being pivotally connected between said base support and said primary reflector to pivot said primary and secondary reflectors in response to said control means.

9. The solar energy collector apparatus, as given in claim 8, wherein said control means includes a light sensing device which generates a control signal used for adjusting said primary and secondary reflectors via said extendable control device.

10. The solar energy collector apparatus, as given in claim 9, wherein said extendable control device is a hydraulic cylinder.

11. The solar energy collector apparatus, as given in claim 7, wherein said conduit means is located below an elongated opening in the bottom of said primary reflector.

12. The solar energy collector apparatus, as given in claim 11, comprising insulation means extending below said elongated opening and around said conduit means to prevent loss of heat from said conduit means, door means pivotally connected to said primary reflector means for closing said elongated opening.

13. The solar energy collector apparatus, as given in claim 12, comprising door control means for opening and closing said door means, said door control means being carried by said primary reflector means.

14. The solar energy collector apparatus, as given in claim 7, wherein said elongated axis of said primary and secondary reflectors are oriented in a generally north to south direction, said conduit means being on a slight incline so that said fluid must be forced therethrough.

* * * * *